US008729436B2

(12) United States Patent
Adrian et al.

(10) Patent No.: US 8,729,436 B2
(45) Date of Patent: May 20, 2014

(54) DRYING PROCESS AND APPARATUS FOR CERAMIC GREENWARE

(75) Inventors: Paul Andreas Adrian, Weselberg (DE); Rebecca Lynn Burt, Painted Post, NY (US); James Anthony Feldman, Campbell, NY (US); Elizabeth Marie Vileno, Corning, NY (US)

(73) Assignee: Corning Incorporated, Corning, NY (US)

( * ) Notice: Subject to any disclaimer, the term of this patent is extended or adjusted under 35 U.S.C. 154(b) by 1392 days.

(21) Appl. No.: 12/473,937

(22) Filed: May 28, 2009

(65) Prior Publication Data

US 2009/0294438 A1 Dec. 3, 2009

Related U.S. Application Data

(60) Provisional application No. 61/130,370, filed on May 30, 2008.

(51) Int. Cl.
*H05B 6/64* (2006.01)
*B29C 67/00* (2006.01)
*F26B 3/34* (2006.01)

(52) U.S. Cl.
USPC ........... 219/681; 219/678; 264/489; 264/630; 264/491; 264/413; 264/430; 34/259; 34/248; 34/396; 34/255; 34/85

(58) Field of Classification Search
CPC ........ H05B 6/64; F26B 3/347; C04B 38/0006
USPC ............ 264/489, 630, 491, 413–430; 34/259, 34/248, 255, 260, 265, 396, 85, 86, 218, 34/219, 77, 78, 79, 493, 497, 330; 219/678, 681
See application file for complete search history.

(56) References Cited

U.S. PATENT DOCUMENTS

| | | | | |
|---|---|---|---|---|
| 2,884,091 A | | 4/1959 | Baldwin | 183/71 |
| 2,952,333 A | | 9/1960 | Bush | 183/71 |
| 3,242,649 A | | 3/1966 | Rivers | 55/132 |
| 3,885,977 A | | 5/1975 | Lachman et al. | 106/62 |
| 4,567,340 A | * | 1/1986 | Latchum, Jr. | 219/701 |
| 4,837,943 A | | 6/1989 | Mizutani | 34/1 |
| 4,979,315 A | * | 12/1990 | Pierson | 34/69 |
| 4,992,233 A | | 2/1991 | Swaroop et al. | 419/2 |
| 5,011,529 A | | 4/1991 | Hogue et al. | 75/235 |
| 5,106,295 A | | 4/1992 | Misawa | 432/253 |
| 5,191,183 A | | 3/1993 | Balbaa et al. | 219/10.55 M |
| 5,258,150 A | | 11/1993 | Merkel et al. | 264/43 |
| 5,263,263 A | * | 11/1993 | Gheorghiu et al. | 34/250 |
| 5,265,346 A | | 11/1993 | Jikumaru et al. | 34/1 J |

(Continued)

FOREIGN PATENT DOCUMENTS

| | | |
|---|---|---|
| EP | 0 618 416 | 11/2000 |
| EP | 1 212 575 | 8/2006 |

*Primary Examiner* — Dana Ross
*Assistant Examiner* — Ket D Dang
(74) *Attorney, Agent, or Firm* — Charles A. Greene; Matthew B. McNutt

(57) ABSTRACT

A method and system for drying a honeycomb structure having an original liquid vehicle content includes exposing the honeycomb structure to a first electromagnetic radiation source until the liquid vehicle content is between about 20% and about 60% of the original liquid vehicle content, exposing the honeycomb structure to a second electromagnetic radiation source different from the first electromagnetic radiation source until the liquid vehicle content is between about 0% and about 30% of the original liquid vehicle content, and exposing the honeycomb structure to convection heating until the liquid vehicle content is between about 0% and about 30% of the original liquid vehicle content.

19 Claims, 2 Drawing Sheets

(56) References Cited

U.S. PATENT DOCUMENTS

| | | | | | |
|---|---|---|---|---|---|
| 5,361,514 | A * | 11/1994 | Lahoda et al. | 34/391 |
| 5,388,345 | A * | 2/1995 | Brundage et al. | 34/256 |
| 5,403,787 | A | 4/1995 | Day | 501/7 |
| 5,406,058 | A * | 4/1995 | Lipp | 219/774 |
| 5,513,447 | A | 5/1996 | Yoshida | 34/491 |
| 5,538,681 | A | 7/1996 | Wu | 264/432 |
| 5,802,959 | A * | 9/1998 | Benson et al. | 99/355 |
| 5,911,941 | A * | 6/1999 | Rokhvarger et al. | 264/432 |
| 6,089,860 | A | 7/2000 | Dull et al. | 432/72 |
| 6,099,793 | A | 8/2000 | Dull et al. | 264/631 |
| 6,172,346 | B1 | 1/2001 | Wroe | 219/681 |
| 6,259,078 | B1 | 7/2001 | Araya | 219/709 |
| 6,325,963 | B1 | 12/2001 | Dull et al. | 264/631 |
| 6,344,634 | B2 | 2/2002 | Brennan | 219/681 |
| 6,344,635 | B2 | 2/2002 | Brennan | 219/681 |
| 6,455,826 | B1 | 9/2002 | Araya et al. | 219/699 |
| 6,539,644 | B1 | 4/2003 | Araya | 34/259 |
| 6,583,394 | B2 | 6/2003 | Araya et al. | 219/685 |
| 6,620,751 | B1 | 9/2003 | Ogunwumi | 501/134 |
| 6,706,233 | B2 | 3/2004 | Araya et al. | 264/432 |
| 6,725,567 | B2 | 4/2004 | Yano et al. | 34/419 |
| 6,878,337 | B2 | 4/2005 | Noguchi et al. | 419/17 |
| 6,932,932 | B2 | 8/2005 | Miura et al. | 264/414 |
| 6,942,713 | B2 | 9/2005 | Ogunwumi et al. | 55/523 |
| RE38,888 | E | 11/2005 | Beall et al. | 501/119 |
| 7,001,861 | B2 | 2/2006 | Beall et al. | 501/128 |
| 7,017,278 | B2 | 3/2006 | Kato | 34/259 |
| 7,087,874 | B2 | 8/2006 | Ishikawa et al. | 219/701 |
| 7,143,526 | B2 | 12/2006 | Katsu | 34/380 |
| 7,197,839 | B2 | 4/2007 | Terazawa et al. | 34/259 |
| 7,259,120 | B2 | 8/2007 | Ellison et al. | 501/134 |
| 2004/0029707 | A1 | 2/2004 | Beall et al. | 501/119 |
| 2004/0104514 | A1 * | 6/2004 | Ishikawa et al. | 264/489 |
| 2004/0261384 | A1 | 12/2004 | Merkel et al. | 55/523 |
| 2008/0023886 | A1 * | 1/2008 | Adrian et al. | 264/489 |

* cited by examiner

DRYING PROCESS AND APPARATUS FOR CERAMIC GREENWARE

CROSS-REFERENCE TO RELATED APPLICATIONS

This application claims the benefit of priority to U.S. provisional application No. 61/130,370, filed on May 30, 2008.

FIELD

This disclosure relates to a method for drying ceramic greenware, and in particular, to a method for drying a honeycomb structure in a manner that reduces the amount of time required for sufficient drying thereof while simultaneously maintaining and reducing the amount of fissures produced within those structural bodies as compared to previously employed methods requiring longer relative drying times.

BACKGROUND

In an attempt to reduce atmospheric pollution, many countries are imposing increasingly stringent limits on the composition of the exhaust gases produced by internal combustion engines and released into the atmosphere. The primary harmful substances from internal combustion engines include hydrocarbons, carbon monoxide, nitrogen oxides (NOx) and particulate matter. Heretofore, many methods have been proposed in an attempt to reduce or minimize the quantity of such substances present in the exhaust gases emitted into the environment.

The use of honeycomb structures as filters for removing particulates (e.g., soot) from engine exhaust gases, and as substrates for supporting catalytic materials for purifying engine exhaust gases is known. A particulate filter body may be, for example, a honeycomb article having a matrix of intersecting thin, porous walls that extend across and between its two opposing open end faces and form a large number of adjoining hollow passages, or cells, which also extend between and are open at the end faces. To form a filter, a first subset of cells is closed at one end face, and the remaining cells are closed at the other end face. A contaminated gas is brought under pressure to one face (the "inlet face") and enters the filter body via the cells that are open at the inlet face (the "inlet cells"). Because the inlet cells are sealed at the remaining end face (the "outlet face") of the body, the contaminated gas is forced through the thin, porous walls into adjoining cells that are sealed at the inlet face and open at the opposing outlet face of the filter body (the "outlet cells"). The solid particulate contaminants in the exhaust gas (such as soot), which are too large to pass through the porous openings in the walls, are left behind, and cleaned exhaust gas exits the outlet face of the filter body through the outlet cells.

A substrate for supporting catalytic materials may similarly be a honeycomb structure having a matrix of intersecting walls that extend across and between its two opposing open end faces and form a large number of adjoining hollow passages, or cells, which also extend between and are open at the end faces. The walls are coated with a catalytic material selected to reduce the amount of carbon monoxide (CO), nitrogen oxides (NOx), and/or unburned hydrocarbons (HC) in the exhaust gas as the exhaust gas passes through the cells. These honeycomb structures (i.e., filters and substrates) may have transverse cross-sectional cellular densities of approximately 1/10 to 100 cells or more per square centimeter.

Such honeycomb structures are typically formed by an extrusion process where a material is extruded in a green (uncured) body before the green body is fired to form the final ceramic material of the honeycomb structure. The extruded green bodies can be any size or shape and have relatively low mechanical strength. As used herein, ceramic greenware, or more briefly greenware, refers to bodies comprised of ceramic-forming components that, upon firing at high temperature, form ceramic bodies. The greenware may include ceramic-forming precursor components, ceramic components, and mixtures of various ceramic-forming components and ceramic components. The various components can be mixed together with a liquid vehicle such as, for example, water or glycol. Immediately after extrusion, the greenware possesses some given liquid vehicle content, such as a water or glycol content, at least some of which must be removed, i.e., the greenware must be dried, prior to firing at high temperature.

The drying process must be carried out in a manner that does not cause defects the greenware, such as shape change, cracks, fissures, and the like. Such defects tend to occur when the greenware is overheated during the drying process.

SUMMARY

One aspect is a method for drying a honeycomb structure comprising the steps of providing a honeycomb structure having an original liquid vehicle content, and exposing the honeycomb structure to a first electromagnetic radiation until the liquid vehicle content is between about 20% and about 60% of the original liquid vehicle content. The method further comprises exposing the honeycomb structure to a second electromagnetic radiation different from the first electromagnetic radiation until the liquid vehicle content is between about 0% and about 30% of the original liquid vehicle content, and exposing the honeycomb structure to convection heating until the liquid vehicle content is between about 0% and about 10% of the original liquid vehicle content.

Another aspect includes a system for drying a ceramic greenware that includes a liquid vehicle. In one embodiment, the system comprises a microwave drying center having a microwave generating apparatus adapted to dry the greenware by subjecting the greenware to microwaves, a radio frequency (RF) drying center having an RF generating apparatus adapted to dry the greenware by subjecting the greenware to RF waves, a convection heating center having a convection heating apparatus adapted to dry the greenware by subjecting the greenware to convection heating, and transport means configured to transport the greenware between the microwave drying center and the RF drying center, and between the RF drying center and the convection heating center.

Additional features and advantages will be set forth in the detailed description which follows, and in part will be readily apparent to those skilled in the art from the description or recognized by practicing embodiments as described herein, including the detailed description that follows, the claims as well as the appended drawings.

It is to be understood that both the foregoing general description and the following detailed description present embodiments that are intended to provide an overview of framework for understanding the nature and character of the invention as it is claimed. The accompanying drawings are included to provide a further understanding, and are incorporated into and constitute a part of the specification. The drawings illustrate various embodiments, and together with the description served to explain the principals and operations of the invention as it is claimed.

DETAILED DESCRIPTION

Figure 1:
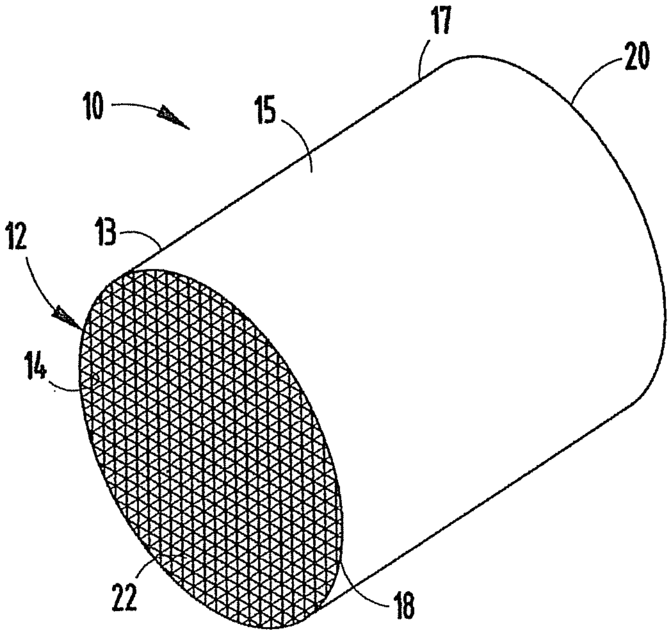
FIG. 1 is a perspective view illustrating an example honeycomb structural body having a plurality of open-ended, longitudinally-extending channels.

Reference is now made in detail to embodiments which are illustrated in the accompanying drawings. Whenever possible, the same reference numerals and symbols are used throughout the drawings to refer to the same or like parts.

Honeycomb structures used for solid particulate filtering, catalytic substrates, and other applications may be formed from a variety of porous materials including, for example, ceramics, glass-ceramics, ceramic-forming components, glasses, metals, cements, resins or organic polymers, papers, or textile fabrics (with or without fillers, etc.), and various combinations thereof. Honeycomb structures having uniformly thin, porous and interconnected walls for solid particulate filtering applications are preferably fabricated from plastically formable and sinterable substances that yield a porous, sintered material after being fired to affect their sintering, such as metallic powders, ceramics, glass-ceramics, cements, and other ceramic-bases mixtures. According to certain embodiments, honeycomb structures may be formed from a porous ceramic material, such as cordierite, silicon carbide, or aluminum titanate. Cordierite is a ceramic composition ($2MgO\text{-}2Al_2O_3\text{-}5SiO_2$) having a very low thermal expansion coefficient, which makes the material resistant to extreme thermal cycling. Cordierite also exhibits high temperature resistance (~1200° C.) and good mechanical strength.

The batch raw materials used in the method of the present disclosure include sources of silica, alumina, titania, and at least one alkaline earth metal. The alkaline earth metal is preferably selected from the group of strontium, barium, calcium, and combinations of these. The raw materials may also include, in combination with those listed above, iron oxide. Most preferably, the batch of inorganic raw materials, as expressed on a weight percent oxide basis, includes 40-65% $Al_2O_3$; 25-40% $TiO_2$; 3-12% $SiO_2$; and 2-10% of an alkaline earth metal oxide selected from the group consisting of SrO, CaO, BaO, and combinations thereof.

To this mixture of components of inorganic raw material components and rare earth metal oxide it is further added processing aids selected from the group of organic and/or organometallic binders, lubricants, plasticizers, pore formers, and aqueous or non-aqueous solvents to form a preferably homogenous and plastic mixture that can be shaped by molding or extrusion. The pore former, such as graphite, starch or polyethylene may optionally be added in order to increase the porosity of the final product. The weight percent of the processing aids are computed as follows: 100×[(processing aid)/(total wt. of inorganic raw materials)].

As an example, FIG. 1 illustrates a solid particulate filter body 10. The filter body 10 includes a honeycomb structure 12 formed by a matrix of intersecting, thin, porous walls 14 surrounded by an outer wall 15, which in the illustrated example is provided in a circular cross-sectional configuration. The walls 14 extend across and between a first end 13 that includes a first end face 18, and a second end 17 that includes an opposing opposite end face 20, and form a large number of adjoining hollow passages or cell channels 22 which also extend between and are open at the end faces 18, 20 of the honeycomb structure 12. The walls 14 have porosity suitable for the intended application (e.g., a filter or substrate) of the honeycomb structure 12, and may have either a uniform thickness or a non-uniform thickness, depending upon the intended application. The thickness and spacing of the walls 14 are selected to provide a density of the cell channels 22 as is desired for the intended application. In some applications, density of the cell channels 22 is in the range of 100-900 cells per square inch, although cell densities lower and higher than that range may also be used. Each cell channel 22 may have a square cross section or may have other cell geometry, e.g., circular, rectangular, triangular, hexagonal, etc. Accordingly, as used in this disclosure, the term "honeycomb structure" is intended to include structures having a generally honeycomb structure and is not limited to a particular cell geometry.

To form some embodiments of a filter, one end of each of the cell channels 22 is sealed, a first subset of the cells being sealed at the first end face 18, and a second subset of the cell channels 22 being sealed at the second end face 20. In an example cell structure, each inlet cell channel is bordered on one or more sides by outlet cell channels and vice versa.

In operation, contaminated fluid (e.g., exhaust gas from a combustion engine) is brought under pressure to an inlet face (i.e., the first end face 18), and enters the resultant filter via the cell channels 22 which have an open end at the given inlet face. Because the cell channels 22 are sealed at the opposite end face, i.e., the outlet face of the body (i.e., the second end face 20), the contaminated fluid is forced through the thin porous walls 14 into adjoining cell channels 22 which are sealed at the inlet face 18 and open to the outlet face 20. The solid particulate contaminates in the fluid, which are too large to pass through the porous openings in the cell walls 14, are left behind and a cleansed fluid exits the filter 10 through the outlet cell channels 22.

Ceramic bodies of honeycomb configuration, or ceramic honeycomb structures, i.e., cellular ceramic bodies, are constructed by preparing a ceramic green body through mixing of, for example, combinations of ceramic precursor materials, ceramic materials, temporary binders, liquid vehicles (including, but not limited to water, glycol, and the like), and various carbonaceous materials, including extrusion and forming aids, to form a plasticized batch, forming the body into a honeycomb-shaped greenware body through extrusion of the plasticized batch, drying the greenware body, and finally firing the greenware body in a firing furnace at a predetermined temperature.

Figure 2A:
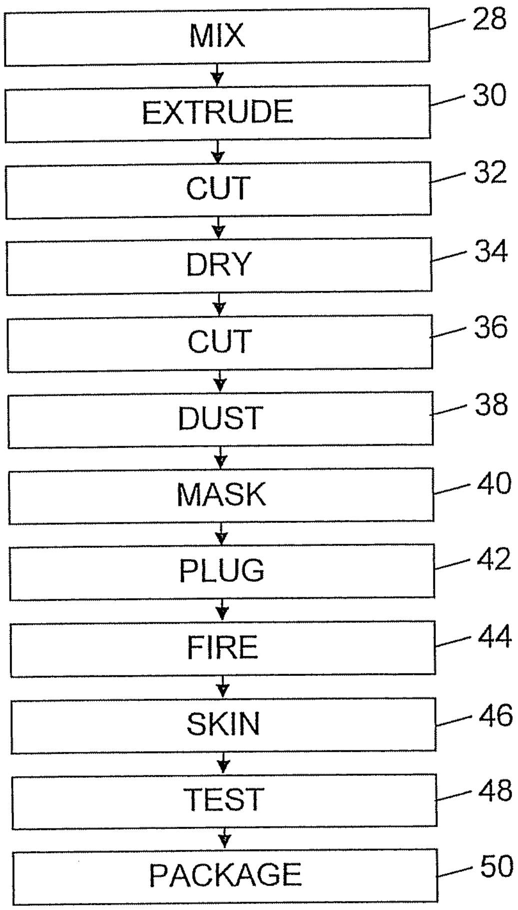
FIG. 2A is a flow chart illustrating one process for manufacturing a honeycomb structural body.

Referring to FIG. 2A, an example method for manufacturing the honeycomb structure 12 described above includes the steps of batch mixing 28 a ceramic solution used to form the honeycomb structure 12, extruding 30 the ceramic solution through die sets thereby forming a greenware honeycomb structure, cutting 32 the greenware into a particular length, and drying 34 of the greenware to form a hardened honeycomb structure. As known in the art, the extrusion operation can be done, for example, using a hydraulic ram extruder, or a two stage de-airing single auger extruder, or a twin screw mixer with a die assembly attached to the discharge end. In the latter mentioned extrusion operation, the proper screw elements are chosen according to material and other process conditions in order to build up sufficient pressure to force the batch material through the die. The extrusion can occur in a vertical plane or a horizontal plane.

Optionally, as illustrated in FIG. 2A, the method may further include one or more additional steps such as cutting 36 the hardened honeycomb structure to provide finished end faces, removing the dust 38 created during the cutting process 36, masking 40 the end faces of the honeycomb structure, plugging 42 certain cell channels of the honeycomb structure (i.e., when forming a filter from the honeycomb structure), firing 44 of the honeycomb structure, and machining 46 an outer skin of the filter. The method may also optionally include testing 48 the filter and packaging 50 the same for shipment.

After the firing step 44, the greenware transforms into a body comprising ceramic material, such as cordierite, and has a honeycomb structure with thin interconnecting porous walls that form parallel cell channels longitudinally extending between end faces, as disclosed, for example, in U.S. Pat. Nos. 2,884,091, 2,952,333, 3,242,649, 3,885,997and 5,403,787 which patents are incorporated by reference herein in their entirety. Exemplary inorganic batch component mixtures suitable for forming cordierite-based bodies are disclosed, for example, in U.S. Pat. No. 5,258,150; U.S. Pat. Pubs. Nos. 2004/0261384 and 2004/0029707; and U.S. Pat. No. RE 38,888, while U.S. Pat. Nos. 4,992,233 and 5,011,529 describe honeycombs of similar cellular structure extruded from batches incorporating metal powders, all of which are incorporated by reference herein in their entirety. Other exemplary ceramic bodies comprised of aluminum-titanate (AT) based ceramic materials are discussed, for example in U.S. Pat. Nos. 7,001,861, 6,942,713, 6,620,751, and 7,259,120, which patents are incorporated by reference herein in their entirety. AT-based bodies can be used as an alternative to cordierite and silicon carbide (SiC) bodies for high-temperature applications, such as automotive emissions control applications. The systems and methods disclosed herein apply to any type of greenware 12 amenable to electromagnetic radiation and convection drying techniques.

With particular focus on the greenware drying step 34, it is noted that extruded greenware contains a liquid vehicle (e.g., water, glycol and the like) in the range of about 10-25% by weight, and that the greenware needs to be dried in the process of forming the final product. Microwave (MW) drying methods can quickly remove the liquid vehicle content and dry the greenware. Microwave drying works best when the wet material and the dry material comprising the greenware have very different dielectric properties. Specifically, MW drying works best when the wet material is a high loss material (due to the liquid vehicle component), and the dry material is a low loss material. In this way, as the greenware is dried, the microwave generated electromagnetic field interacts most strongly with the wettest parts of the greenware. Concurrently, the driest parts of the greenware become substantially transparent at the microwave wavelength, thus preventing runaway heating of the greenware and the defects resulting therefrom, most notable of which are shape change and cracking of the greenware. Runaway heating may occur with greenware in which both wet and dry components include high loss materials. Specifically, high loss dry material of the greenware continues to absorb microwave energy, but no longer has the endothermic evaporative cooling provided by the evaporating liquid vehicle content to prevent runaway heating. Thus, continuing to supply microwave energy to the greenware increases the temperature of the dry areas of the ware (typically the ends, but sometimes other areas, dependent on orientation, size, geometry, material and dryer configuration). Those dry areas may become hot enough to start the decomposition process of the organics present in the greenware, which is undesirable. Indications of decomposition of organics in the greenware include but are not limited to, for example, smoldering, burning of the methocel, loss of oils in the extrudate, ignition of the oils in the extrudate, and the like. However, if MW drying is stopped to prevent runaway heating, additional drying of the greenware may still be necessary as the more interior regions of the greenware may still be wet.

Runaway heating is prevented by applying multiple drying steps, without requiring changes to the desired ceramic-forming composition. When fully wet, the material comprising the greenware is subjected to electromagnetic radiation heating, while runaway heating is prevented due to the evaporative cooling of the relatively wet greenware. Microwave drying is often used for electromagnetic radiation heating and drying, as the equipment for MW drying is generally easier to design and control with high loss materials, and arcing is easily prevented. In addition, the surface (i.e., skin) quality of the resultant greenware can be better controlled due to better atmosphere control, as well as the "conditioning" of the greenware skin caused by the low penetration depth of microwaves into the greenware that causes much of the heating of the greenware to occur on the surface. However, due to the low penetration depth of microwaves, when the dry material of the greenware is also high loss, the interior of the greenware may remain cool and wet long after the skin is dry. Accordingly, additional drying using electromagnetic radiation at a frequency having a greater penetration depth than microwaves (e.g., radio frequency radiation) is beneficially used for continued drying of the greenware.

Figure 2B:
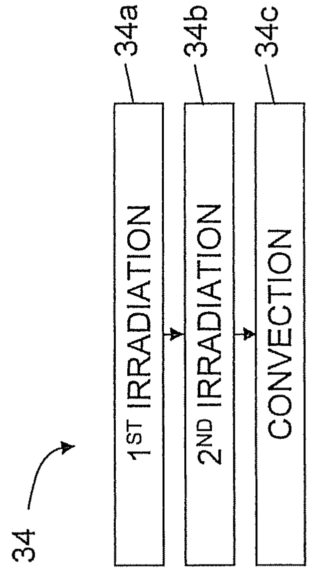
FIG. 2B is a flow chart illustrating an example ceramic greenware drying method.

As illustrated in FIG. 2B, drying step 34 of FIG. 2A is a multi-step process. In one embodiment, at step 34*a* the greenware is exposed to a first electromagnetic radiation until the liquid vehicle content of the greenware is between about 20% and about 60% of the original liquid vehicle content. At step 34*b*, the greenware is exposed to a second electromagnetic radiation different from the first electromagnetic radiation of step 34*a* until the liquid vehicle content of the greenware is between about 0% and about 30% of the original liquid vehicle content. At step 34*c*, the greenware is exposed to convection heating until the liquid vehicle content of the greenware is between about 0% and about 10% of the original liquid vehicle content. Steps 34*a* through 34*c* are described in further detail below.

Generally, the greenware is placed on trays or supports and then sent through a drying system. In one embodiment of a drying system, a first electromagnetic drying center generates a first electromagnetic radiation, such as MW radiation, that is absorbed by and heats the greenware, a second electromagnetic drying center generates a second electromagnetic radiation, such as RF radiation that is absorbed by and heats the greenware, and a convection drying center heats the greenware via convection heating. The liquid carrier is thus removed and the greenware dried by the progressive combination of electromagnetic radiation heating and convection heating. In one embodiment, the first electromagnetic radiation has a first penetration depth into the greenware, and the second electromagnetic radiation has a second different penetration depth into the greenware. In one embodiment, the second penetration depth is greater than the first penetration depth. In one embodiment, the first electromagnetic radiation dries the exterior surface of the greenware faster than the interior of the greenware.

Figure 3:
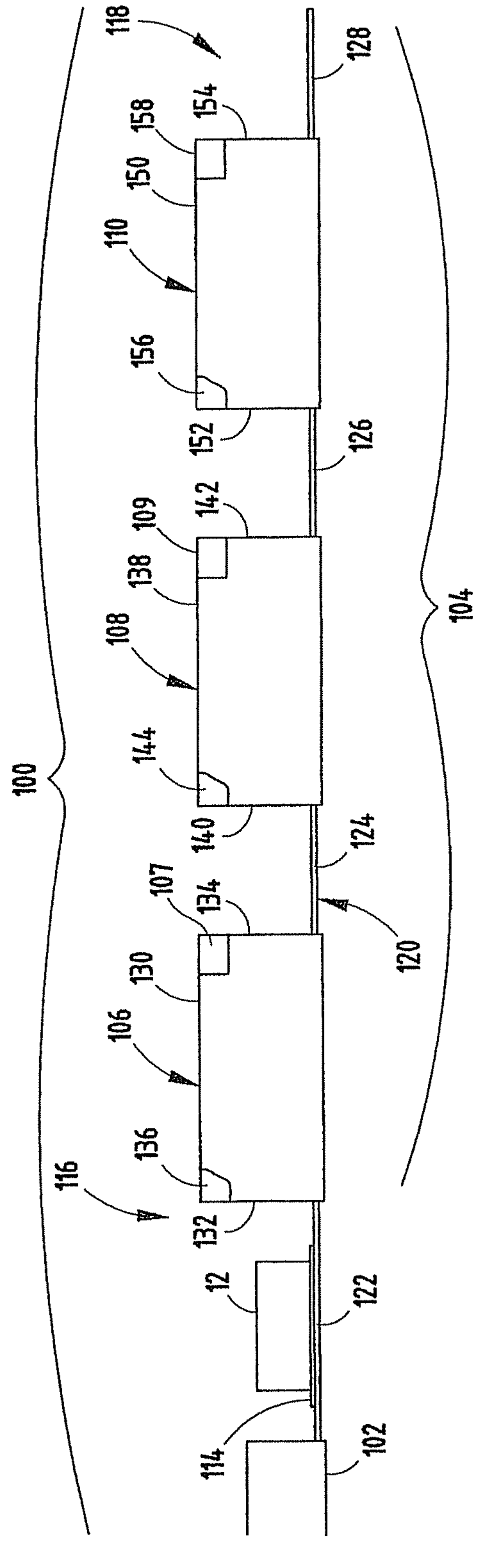
FIG. 3 is a schematic illustration of an example greenware forming system including a greenware drying system utilized to manufacture a honeycomb structural body.

FIG. 3 is a schematic diagram of an exemplary greenware forming system 100 that includes an extruder 102 followed by a three-step drying system 104 that includes a first electromagnetic radiation dryer or drying center 106 having a first electromagnetic generating apparatus 107, followed by a second electromagnetic radiation dryer or drying center 108 having a second electromagnetic generating apparatus 109, which is subsequently followed by a convection heating center 110. In one embodiment, the first electromagnetic generating apparatus 107 comprises a microwave (MW) generating apparatus. In one embodiment, the second electromagnetic generating apparatus 109 comprises a radio frequency (RF) generating apparatus. The greenware or honeycomb structure 12 is shown in the form of extruded pieces supported in trays 114.

The drying system 104 has an input end 116 and an output end 118. The greenware 12 within the trays 114 are conveyed between the input end 116 and the output end 118 by suitable transport means 120. In one example, transport means 120 comprises a conveyor system having one or more conveyor sections, namely, an input section 122, a first central section 124, a second central section 126, and an output section 128. The greenware 12 is conveyed by transport means 120 (e.g., a conveyor system) between the input end 116 and the output end 118 so as to travel sequentially through the first drying center 106 to the second drying center 108, and then the convection heating center 110.

The first electromagnetic drying center 106 includes a housing 130 with an input end 132, an output end 134 and an interior 136, and the first electromagnetic generating apparatus 107 that, in one example, generates microwave radiation. The second drying center 108 includes a housing 138 with an input end 140, an output end 142 and an interior 144, and the second electromagnetic generating apparatus 109 that, in one example, generates RF radiation. In one example, RF radiation may be generated, e.g., by a parallel plate applicator as is known in the art. The convection heating center 110 includes a housing 150 with an input end 152, an output end 154 and an interior 156, and a convection heating source 158.

In the general operation of the drying system 110, the greenware 12 extruded from the extruder 102 is placed in a corresponding tray 114 and conveyed via input conveyor section 122 to the input end 116 of drying system 104. The greenware 12 is conveyed into the interior 136 of the first electromagnetic drying center 106 where the greenware is exposed, in one example, to microwave energy. In the illustrated example, the greenware 12 is exposed to the first electromagnetic radiation (e.g., microwave radiation) until the liquid vehicle content of the greenware 12 is within the range of about 20% to about 60% of the original liquid vehicle content of the greenware 12 prior to entering the drying system 104. Preferably, the exposure of the greenware 12 to the first electromagnetic radiation is suspended prior to the decomposition of any organic material within the greenware 12. In one embodiment, exposure of the greenware 12 to the first electromagnetic radiation is suspended after any portion of the greenware reaches or exceeds the boiling point of the liquid vehicle. In one embodiment, exposure of the greenware 12 to the first electromagnetic radiation is suspended when the temperature of the greenware is at least 20° C. less than the temperature at which the organic materials therein start to decompose in the greenware 12.

In one embodiment, when the first electromagnetic radiation is microwave radiation, the microwaves are applied with the range of between 500 MHz and 30 GHz. In one embodiment, microwaves are applied within the range of between 800 MHz and 3 GHz. In one embodiment, microwaves are applied within the range of between 890 MHz and 920 MHz. In some embodiments, the first electromagnetic radiation is applied with power levels within the range of about 5 kW to about 1000 kW.

Following passage through the first drying center 106, the greenware 12 is conveyed to the input end 140 of second drying center 108 via the first central section 124 of the transport means 120 and enters the interior 144 where the greenware is exposed to a second electromagnetic radiation (e.g., RF radiation) as it passes the second electromagnetic generating apparatus 109. In the illustrated example, the greenware 12 is exposed to the second electromagnetic radiation until the liquid vehicle content of the greenware 12 is within the range of about 0% to about 30% of the original liquid vehicle content of the greenware 12 prior to entering the drying system 104.

In one embodiment, when second electromagnetic radiation is radio frequency radiation, radio waves are applied within the range of between 2 MHz and 500 MHz. In one embodiment, radio waves are applied within the range of between 4 MHz and 50 MHz. In one embodiment, radio waves are applied within the range of between 25 MHz and 41 MHz. In some embodiments, the second electromagnetic radiation is applied with the power levels of within the range of about 5 kW to about 1000 kW.

Following passage through second drying center 108, the greenware 12 is conveyed to the input end 152 of the convection heating center 110 via the central conveyor second section 126 and enters the interior 156 where it is dried via a convection heating process. In one embodiment, the greenware 12 enters the convection heating center 110 at temperatures of within the range of between about 80° C. and about 150° C. In one embodiment, the greenware 12 enters the convection heating center 110 at temperatures between about 20° C. below the boiling point of the liquid vehicle and about 50° C. above of the boiling point of the liquid vehicle. In one embodiment, the greenware 12 is dried via convection heating until the liquid vehicle content of the greenware 12 is within the range of about 0% to about 10% of the original liquid vehicle content, and more preferably within the range of about 0% to about 2% of the original liquid vehicle content. In one embodiment, the preceding steps of drying with first and second electromagnetic radiation allows the greenware 12 to be dried to the necessary stage via convection heating for less than about 24 hours. In one embodiment, convection heating occurs for less than about one hour. In one embodiment, the liquid vehicle is water and the convection heating is conducted within a temperature range of between about 80° C. and about 150° C. In one embodiment, the liquid vehicle is water and the convection heating is conducted within the range of between about 100° C. and about 120° C.

EXAMPLE

By way of example, a shaped green body was cut into logs and dried according to the method described herein. In one implementation, a continuous greenware extrudate having water as a liquid vehicle was cut into logs each having an open frontal area of about 50%, a diameter of about 15 cm, a length of about 30 cm, and a weight of approximately 5 kg. In the first electromagnetic drying center, approximately 0.4 kWhr to 0.5 kWhr of microwave energy was applied per each log. Residence times within the first (MW) drying center were in the range of about 15 minutes to about 20 minutes. The liquid vehicle content of the greenware logs at the exit of the first drying center was approximately 50% (+/−5%) of the original liquid vehicle content. The greenware was then transported to the second electromagnetic drying center, where approximately 0.3 kWhr to 0.4 kWhr of radio frequency energy was applied per log. Residence times within the second (RF) drying center were in the range of about 10 minutes to about 20 minutes. The liquid vehicle content of the greenware at the exit of the second drying center was approximately 10% (+/−5%) of the original liquid vehicle content. After exiting the second drying center, the greenware was transported to a convection oven at about 110° C. for about 45 minutes to complete the drying cycle and obtain greenware that had a liquid vehicle content of about 2% to 0% of the original liquid vehicle content.

As disclosed herein, in one embodiment, partial drying of the greenware is performed by exposing the greenware to a succession of more than one form of electromagnetic radiation heating prior to convection heating of the greenware, and thereby avoids the creation of potentially damaging "hot spots" on or within the greenware. The drying system and method described herein are particularly useful for greenware that contains high loss materials, such as graphite. In one embodiment, the succession of electromagnetic radiation heating utilizes electromagnetic radiation forms having different penetration depths in the greenware. As a result, it is beneficial to use a multiple-step drying process wherein the greenware bodies are only partially dried using electromagnetic radiation. In one embodiment, microwave radiation and RF radiation are used in succession to at least partially dry the greenware and thereby allow complete drying of the greenware via convection heating in a relatively reduced amount of time. In some embodiments, the greenware may be protected from uneven cooling and heating before and between each of the drying steps through the use of plastic wrap, misting, optimizing tray materials, covers, and the like.

It will be apparent to those skilled in the art that various modifications and variations can be made to the described embodiments without departing from the spirit and scope of the claimed invention.

What is claimed is:

1. A method for drying a honeycomb structure comprising:

providing the honeycomb structure having an original liquid vehicle content;

exposing the honeycomb structure to a first electromagnetic radiation until the liquid vehicle content is between about 20% and about 60% of the original liquid vehicle content, so that the honeycomb structure is partially dried;

exposing the partially dried honeycomb structure to a second electromagnetic radiation different from the first electromagnetic radiation until the liquid vehicle content is between about 0% and about 30% of the original liquid vehicle content, so that the honeycomb structure is at least partially dried;

exposing the at least partially dried honeycomb structure to convection heating until the liquid vehicle content is between about 0% and about 10% of the original liquid vehicle content; and wherein the first electromagnetic radiation comprises microwave radiation, and wherein the second electromagnetic radiation comprises radio frequency radiation.

2. The method of claim 1, wherein the step of exposing the at least partially dried honeycomb structure to convection heating is continued until the liquid vehicle content is between about 0% and 2% of the original liquid vehicle content.

3. The method of claim 1, wherein the step of exposing the at least partially dried honeycomb structure to convection heating includes exposing the at least partially dried honeycomb structure to convection heating for a period of less than about 24 hours.

4. The method of claim 3, wherein the step of exposing the at least partially dried honeycomb structure to convection heating includes exposing the honeycomb structure to convection heating for a period of less than or equal to about 1 hour.

5. The method of claim 1, wherein the step of exposing the honeycomb structure to the first electromagnetic radiation is suspended prior to the step of exposing the partially dried honeycomb structure to the second electromagnetic radiation.

6. The method of claim 1, wherein the step of exposing the partially dried honeycomb structure to the second electromagnetic radiation is suspended prior to the step of exposing the at least partially dried honeycomb structure to convection heating.

7. The method of claim 1, wherein the step of exposing the honeycomb structure to the first electromagnetic radiation is suspended prior to decomposition of organic materials in the honeycomb structure.

8. The method of claim 7, wherein the step of exposing the honeycomb structure to the first electromagnetic radiation is suspended when a temperature of the honeycomb structure is at least 20° C. less than decomposition temperature of organic materials in the honeycomb structure.

9. The method of claim 8, wherein the step of exposing the honeycomb structure to the first electromagnetic radiation continues until a maximum temperature of the honeycomb structure is equal to about the boiling point of the liquid vehicle.

10. The method of claim 1, wherein providing the second electromagnetic radiation as radio frequency (RF) radiation includes generating the RF energy from a parallel plate RF dryer.

11. A method for drying a greenware comprising:

providing the greenware comprising a ceramic material, a binder and an original liquid vehicle content;

performing a first drying of the greenware with a first electromagnetic radiation until the liquid vehicle content is between about 20% and about 60% of the original liquid vehicle content;

after the first drying, performing a second drying of the greenware with a second electromagnetic radiation until the liquid vehicle content is between about 0% and about 30% of the original liquid vehicle content;

after the second drying, heating the greenware with convection heating until the liquid vehicle content is between about 0% and about 2% of the original liquid vehicle content; and wherein the first electromagnetic radiation comprises microwave radiation, and wherein the second electromagnetic radiation comprises radio frequency radiation.

12. The method of claim 11, wherein the step of heating the greenware with convection heating includes heating the greenware with convection heating for a period of less than about 24 hours.

13. The method of claim 12, wherein the step of heating the greenware with convection heating includes heating the ware with convection heating for a period of less than or equal to about 1 hour.

14. The method of claim 11, wherein the first step of drying the greenware with the first electromagnetic radiation is suspended prior to the step of drying the greenware with the second electromagnetic radiation.

15. The method of claim 11, wherein the second step of drying the greenware with the second electromagnetic radiation is suspended prior to the step heating the greenware with convection heating.

16. The method of claim 11, wherein the first step of drying the greenware with the first electromagnetic radiation is suspended prior to decomposition of organic materials in the greenware.

17. The method of claim 16, wherein the first step of drying the greenware with the first electromagnetic radiation is suspended when a temperature of the greenware is at least 20° C. less than decomposition temperature of organic materials in the greenware.

18. The method of claim 17, wherein the first step of drying of the greenware with the first electromagnetic radiation continues until a maximum temperature of the greenware is equal to about the boiling point of the liquid vehicle.

19. The method of claim 11, wherein the first electromagnetic radiation has a first penetration depth in the greenware, the second electromagnetic has a second penetration depth in the greenware, and wherein the second penetration depth is larger than the first penetration depth.

* * * * *